(No Model.)

F. RUPP & D. F. SMITH.
VEHICLE SPRING.

No. 325,015. Patented Aug. 25, 1885.

WITNESSES:
Donn Twitchell
C. Sedgwick

INVENTOR:
F. Rupp
D. F. Smith
BY Munn & Co
ATTORNEYS.

UNITED STATES PATENT OFFICE.

FREDRICK RUPP AND DANIEL F. SMITH, OF MILFORD, INDIANA.

VEHICLE-SPRING.

SPECIFICATION forming part of Letters Patent No. 325,015, dated August 25, 1885.

Application filed October 3, 1884. (No model.)

*To all whom it may concern:*

Be it known that we, FREDRICK RUPP and DANIEL F. SMITH, of Milford, in the county of Kosciusko and State of Indiana, have invented a new and Improved Spring, of which the following is a full, clear, and exact description.

The invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
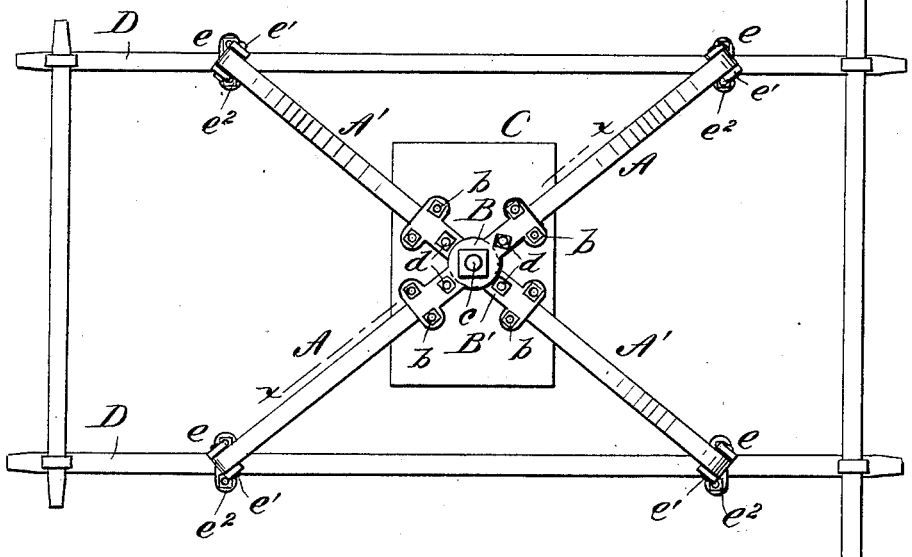
Figure 2:
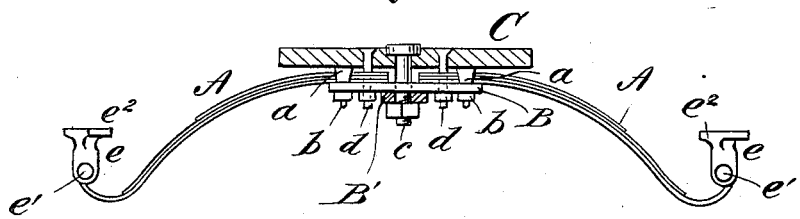
Figure 3:
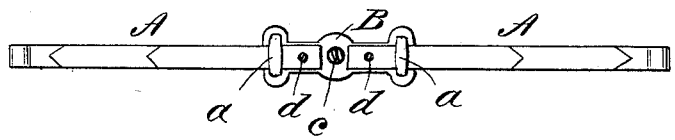

Figure 1 is an inverted plan view of the side bars and one axle of a vehicle having our new spring applied thereto. Fig. 2 is a sectional elevation taken on the line $x\ x$ of Fig. 1, and Fig. 3 is a plan view of one half of the spring, showing one of the coupling-plates.

A A and A' A' represent four separate springs, duplicates of each other, and curved downward, as shown in Fig. 2.

B B' represent two coupling-plates, to which the ends of the springs A A' are respectively secured by the keepers $a$ and nuts $b$. The coupling-plates are crossed to form an X-spring, and are held by the central bolt, $c$, which serves as a pivot to the parts of the spring, so that the spring may be adjusted to suit vehicles of different widths. The bolt $c$ also serves to secure the parts of the spring to the platform C, on which the body of the vehicle may be placed, and the springs and coupling-plates are held to the platform C also by the through-bolts $d$.

To the ends of the springs A A' are secured the shackles $e$, by which the springs may be secured to the side bars, D D, or other springs or parts of the running-gear of the vehicle, and the pins $e'$ of these clips are set diagonally to the plates $e^2$ thereof, so as to accommodate the crossed or diagonal position of the springs A A'.

Constructed in the manner described, the spring is applicable to various forms and sizes of vehicles, is more uniform in its action when unequally loaded than common springs, and is therefore easy riding, and not so liable to break as common springs, and the spring as a whole is cheap, durable, and practical.

Having thus described our invention, we claim as new and desire to secure by Letters Patent—

The combination, with the platform C, of the two separate and independent crossed plates B B', provided with the keepers $a\ a$ at their opposite ends and with central apertures and apertures on either side of the central aperture, the central bolt, $c$, passing through the platform and plates B, the springs A A' having their inner ends within the keepers, and the bolts $d$, passing through the platform, springs A A', and the plates, substantially as set forth.

FREDRICK RUPP.
DANIEL F. SMITH.

Witnesses:
HARLAN E. KING,
JAMES H. HUFFMAN.